United States Patent [19]

Garner

[11] Patent Number: 5,211,963
[45] Date of Patent: May 18, 1993

[54] EXTRUSION APPARATUS
[75] Inventor: John N. Garner, Kingston, Canada
[73] Assignee: Northern Telecom Limited, Montreal, Canada
[21] Appl. No.: 879,632
[22] Filed: May 7, 1992
[51] Int. Cl.⁵ .......................................... B29C 63/00
[52] U.S. Cl. ................................ 425/113; 264/260; 425/131.1; 425/133.1
[58] Field of Search ............... 264/260; 425/113, 114, 425/131.1, 133.1, 200, 376.1

[56] References Cited

U.S. PATENT DOCUMENTS 3,277,225 10/1966 Heard, Jr. ..................... 425/133.1
3,692,447 9/1972 Nelson ............................. 425/113
4,280,801 7/1981 Wheeler, Jr. et al. ............. 425/113

Primary Examiner—Jay H. Woo
Assistant Examiner—Scott Bushey
Attorney, Agent, or Firm—R. J. Austin

[57] ABSTRACT

Dual extrusion apparatus with a horizontal extruder and a vertical extruder connected to an extruder head and in which the weight of the vertical extruder is carried by a frame. The vertical material extruder is permitted to expand upwardly under temperature variations so as to minimize stress. Also, the extruder head and the vertical extruder are movable together horizontally to comply with temperature induced expansion and contraction.

13 Claims, 4 Drawing Sheets

EXTRUSION APPARATUS

This invention relates to extrusion apparatus.

BACKGROUND OF THE INVENTION

Conventionally, when a covering layer of elastomeric material is applied to a core of indefinite length, the layer is extruded onto the core. In the manufacture of electrical cable, an insulation layer is formed in this way by extrusion apparatus operating with a single extrusion head. Particularly in the case of telecommunications cables, electrical conductors may each be provided individually with two layers of elastomeric insulation, i.e. an inner and an outer layer, which provide different electrical properties. For the purpose of forming two layers of insulation, it is now conventional practice to employ the use of an extruder head known as a "dual" extruder head which is supplied with extrudate for the two layers from two different extruders each connected to an individual inlet of the dual extruder head.

There are practical problems in connecting two extruders directly to a dual extrusion head. It has been found that once such an assembly is in use, the effects of the different rates of expansion and contraction of the parts of the assembly and caused by the molten extrudate or from the barrel heaters result in distortion and cracking of the head and perhaps of the extruders. In order to overcome this problem in a practical way, it is conventional practice to connect one extruder directly to the head, the other extruder being spaced from the head and connected to it by a flexible transfer tube for the extrudate. A problem with the use of a transfer tube is that the temperature of the extrudate (particularly polyvinylchloride) as it passes along the transfer tube is difficult to control even with the use of heaters around the tube, and burning of the extrudate easily results. In a case where the extrudate passing through the transfer tube is for providing a foam layer upon a conductor, difficulty has been found in controlling the volume of air space within the finished layer. Such an air space is sometimes referred to as "percentage blow".

SUMMARY OF THE INVENTION

The present invention seeks to provide an apparatus for extruding two layers of material onto a core and which will solve or minimize the above problems.

Accordingly, the present invention provides an apparatus for extruding two layers of material onto a core of indefinite length comprising: a dual extruder head having a passageway terminating in an extrusion orifice for the layers, a passline for the core extending through the passageway and through the extrusion orifice; a horizontal extruder having an extrusion outlet connectable directly to a first inlet to the passageway of the extruder head; an upwardly extending extruder having an extrusion outlet connectable directly to a second inlet to the passageway of the extruder head; and a means to carry the weight of the upwardly extending extruder, said means having pivotal axes to allow for movement of the upwardly extending extruder so as to maintain desired alignment between the extruder head and each extruder and maintain the angular orientation of the upwardly extending extruder to minimize stresses caused by temperature variations while: a) allowing the head during temperature variation induced expansion and contraction, to move the upwardly extending extruder horizontally to comply with the expansion and contraction; and b) allowing temperature variation induced axial extension and contraction of the upwardly extending extruder towards and away from the extruder head.

The apparatus of the invention therefore operates to enable the upwardly extending extruder to be located in its desired position and to be movable horizontally to comply with the expansion and contraction of the head and also to allow the upwardly extending extruder to extend and contract in the axial direction. As a result of this, with each of the extruders secured directly to the dual extruder head, stresses caused by temperature variations are minimized so as to reduce any possibility of cracking of the head or distortion of any parts of the apparatus.

The angular orientation of the upwardly extending extruder may be controlled while permitting the extruder to pivotally move around a horizontally extending pivotal axis. Conveniently for this purpose, the upwardly extending extruder is mounted upon one side of a parallelogram linkage and the horizontal extending pivotal axis lies at a point of connection of two sides of the linkage. The parallelogram linkage may conveniently form part of a support structure for the upwardly extending extruder and an upwardly acting resilient means is included and which is operably connected to the upwardly extending extruder for supporting the combined weights of the extruder and the pivotal sides of the linkage. With this arrangement, the weight of the upwardly extending extruder is not taken directly by the dual extrusion head and the resilient means serves to hold the upwardly extending extruder in position and adjusts itself automatically to continue supporting the weight of the upwardly extending extruder for any expansion of the dual extruder head. Conveniently, the upwardly extending extruder is a vertical extruder and the support structure is pivotally mounted around a first vertical axis of a support carrying linkage. This linkage is pivotally mounted around a second vertical axis to a fixed member. Horizontal movement of the vertical extruder complies with the expansion and contraction of the parts of the apparatus by pivoting of the linkage around the second vertical axis and relative pivoting movement of the elements of the linkage. The linkage may be a simple linkage comprising a first and second links which are pivotally connected together at a position of the links intermediate the first and second vertical axes. Preferably, for simplicity and convenience the first vertical axis of the linkage coincides with the screw axis of the vertical extruder.

BRIEF DESCRIPTION OF THE DRAWINGS

One embodiment of the invention will now be described by way of example, with reference to the accompanying drawings, in which.

DESCRIPTION OF THE PREFERRED EMBODIMENT

Figure 1:
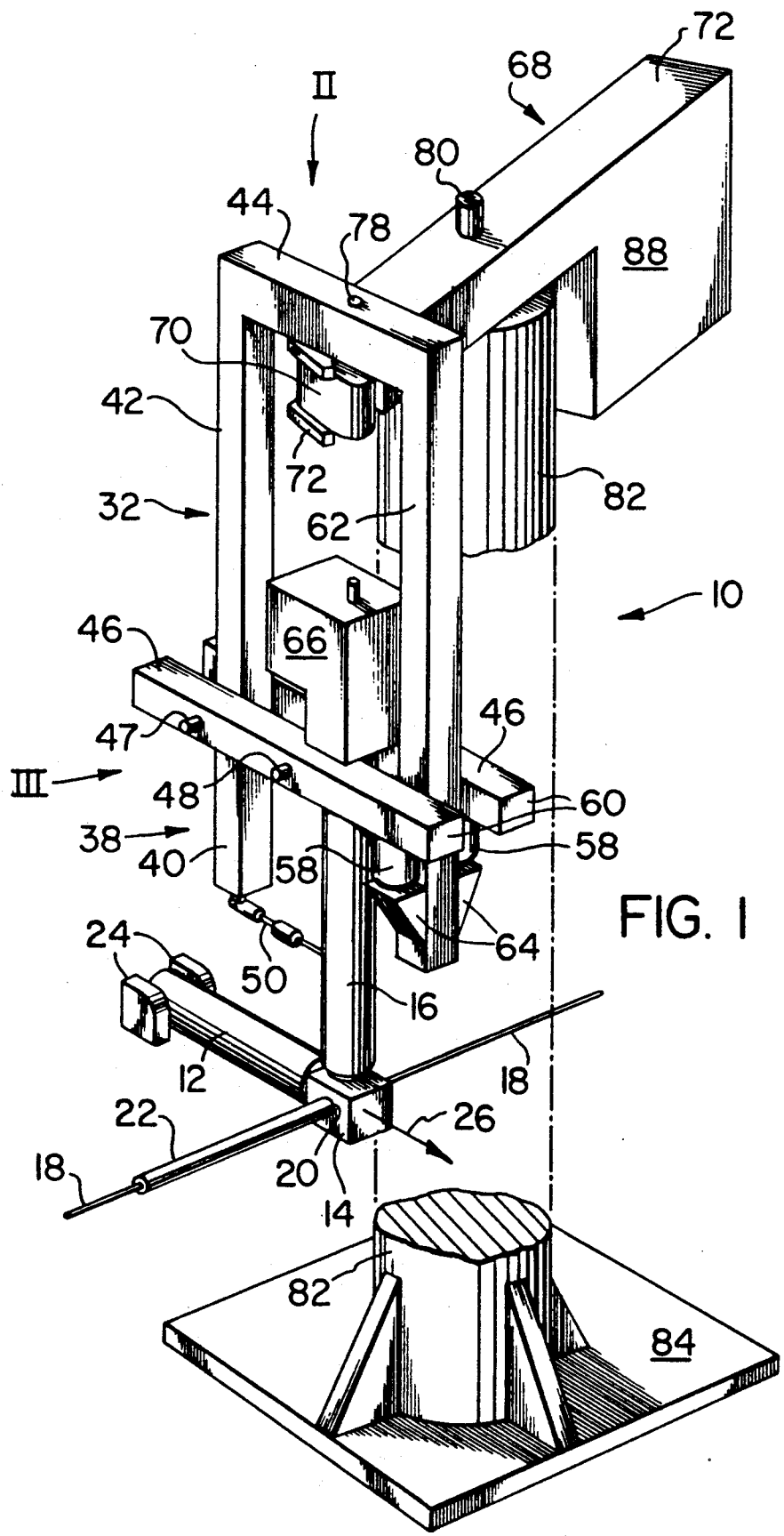
FIG. 1 is an isometric view of apparatus of the embodiment with its parts in relative positions during use.

The drawings show an apparatus 10 according to the embodiment for extruding two layers of elastomeric insulation onto an electric conductor for a telecommunication cable as the conductor moves along a passline. The apparatus 10 comprises a horizontal extruder 12 which is directly connected at its outlet end to one inlet (not shown) of a dual extruder head 14. A second and vertical extruder 16 extends upwardly from the head 14 and has its outlet directly connected to a second inlet of the head. As shown in FIG. 1, a conductor 18 extends along its passline and through the extruder head, the passline extending through an extrusion orifice 20 of the head. In use, the extruder head 14 supplied with different extrudate materials from the extruders 12 and 16 provides the electrical conductor 18 with a surrounding insulation 22 formed from inner and outer layers of insulation.

The assembly of extruders and extruder head is subjected to temperature variations due to the temperatures of the extrudates, these temperature variations causing differential expansions of different parts of the assembly. In the present invention and as exemplified by the embodiment, the arrangement is such that such expansions and subsequent contractions do not result in cracking or distortion of any parts of the assembly.

As shown by FIG. 1, the horizontal extruder 12 is secured in conventional manner, at its upstream end to a fixed mounting 24 which is shown diagrammatically in the figure. Thus, any temperature induced expansion of the horizontal extruder takes place by movement of its downstream end towards the extruder head 14 which displaces the extruder head in the direction of arrow 26 as shown in FIG. 1, i.e. axially of the extruder 12. For such a movement of the extruder head 14 to occur and without resultant distortion or cracking of the extruder head caused because of its connection to the vertical extruder 16, then the vertical extruder 16 must be permitted to move horizontally with the extruder head 14. To allow for this movement to take place and also to enable the vertical extruder to expand axially as its temperature increases due to the heat of the barrel and die heaters and of the extrudate within that extruder, then the vertical extruder is supported in a special and particular way as will now be described.

Figure 3:
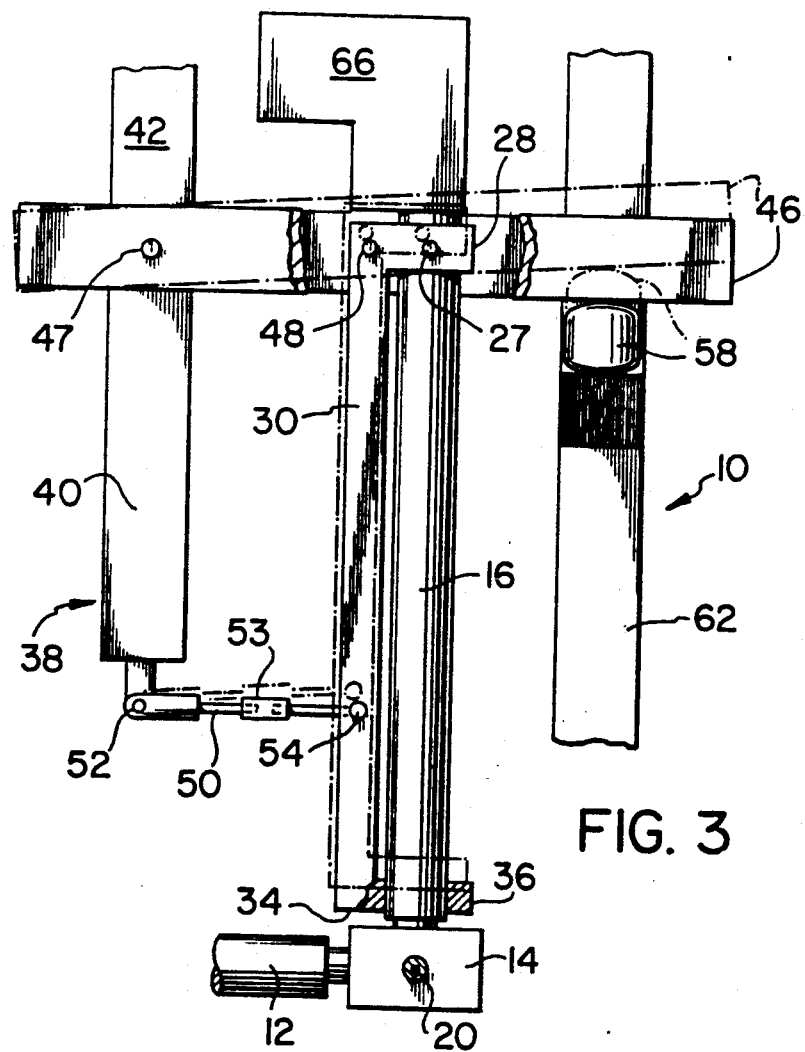
FIG. 3 is a front elevational view of the apparatus and to a much larger scale and in the direction of arrow III in FIG. 1.

As may be seen from FIG. 3 and also with reference to FIG. 3, the vertical extruder is secured at its upper end region by a pin 27 to a horizontal arm 28 of a vertically extending frame member 30. The lower end of the extruder 16 needs to be disposed accurately in position so that its axis is maintained vertically and while allowing for axial expansion and contraction of the extruder relative to the frame member 30. For this purpose, the frame member 30 is provided at its lower end with another horizontally extending arm 34 which provides a stabilizing member for the extruder 16 in that it extends around the extruder and engages the extruder surface at various positions around its circumference while permitting axial sliding movement of the extruder surface relative to the stabilizing member. The stabilizing member comprises a ring 36 which encompasses the lower end region of the extruder 16 which is a sliding fit within the ring. Frame member 30 forms one side of a parallelogram linkage 38 which also includes an opposite side 40 which is parallel to the frame member 30, the opposite side 40 forming a lower end of a vertical support member 42 of a support structure 32, the support member extending upwardly to an upper horizontal beam member 44 of the support structure. The parallelogram linkage 38 also includes upper and lower sides. The upper side is provided by parallel and laterally spaced horizontal beams 46 which are pivotally connected each at one end and at pivotal position 47 to the support member 42 which lies between the beams 46. The beams 46 extend to and beyond a pivotal position 48 at which they are connected to the frame member 30 which also lies between them. As may be seen, with this arrangement the upper end region of the vertical extruder 16 is also placed between the two beams 46, the nearer beam 46 being partially omitted in FIG. 3 to show detail of the arm 28, pivotal position 48 and pin 27. The fourth side of the parallelogram linkage is provided by a link 50 which extends from a lower pivotal connection at position 52 with the support member 40 and another pivotal connection at position 54 with the frame member 30. The link 50 is adjustable, as is evidenced by the turn buckle 53, for the purpose of ensuring the distances between the pivotal positions 52 and 54 and between the pivotal positions 47 and 48 are maintained substantially equal.

An upwardly acting resilient means is provided and which is operably connected to the vertical extruder 16 for supporting the combined weights of the extruder and of the parallelogram linkage so as to minimize any weight which needs to be taken directly upon the extruder head 14. The resilient means comprises at least one gas pressurizable bag, in this case two air pressurizable bags 58 which engage beneath free end regions 60 of the beams 46, the free end regions 60 extending beyond the pivotal position 48 so as to lie one on each side of an upwardly extending carrier frame member 62 for the bags 58. The carrier frame member 62 is secured to the other end of the upper horizontal member 44 from the support member 42 and depends from the beam member 44 in parallel relationship to the support member 42. Towards a lower end of the carrier frame member 62 are provided two support platforms 64, one on each side of the carrier frame member, each of the platforms 64 supporting an individual air bag 58 so that each air bag is contained between its respective platform and the underside of the respective end regions 60 of its beam 46. Each of the air bags 58 has a low spring rate controlled by the air pressure within the bag, and the air pressure is sufficient to support the weight of the vertical extruder 16 and parallelogram linkage while ensuring that it is comfortably secured to the extruder head 14 without its weight acting unduly upon the extruder head. For this purpose, each bag is connected to a pressurizable means (not shown) by which the pressure within the bag may be accurately controlled and adjusted as required.

The drive and drive control 66 for the vertical extruder 16 lies at the upper end of the extruder and is also supported by the beams 46. A hopper arrangement (not shown) for the vertical extruder is also carried by the support structure. A drive for the extruder 12 and raw material feeding (not shown) is provided in conventional manner.

Figure 2:
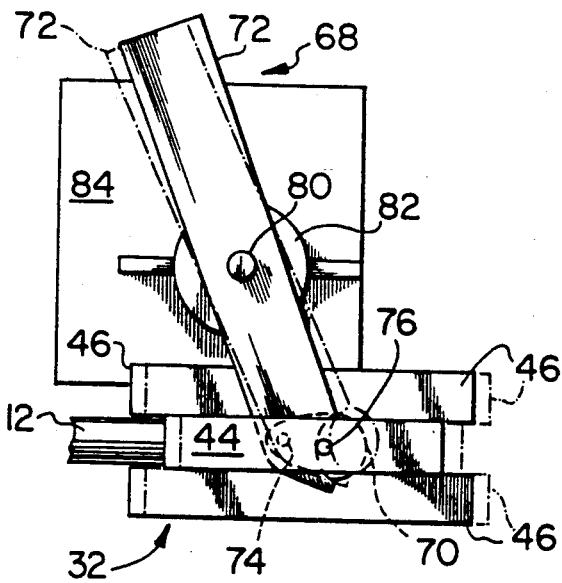
FIG. 2 is a view of the apparatus in the direction of arrow II in FIG. 1 and to a larger scale.
Figure 5:
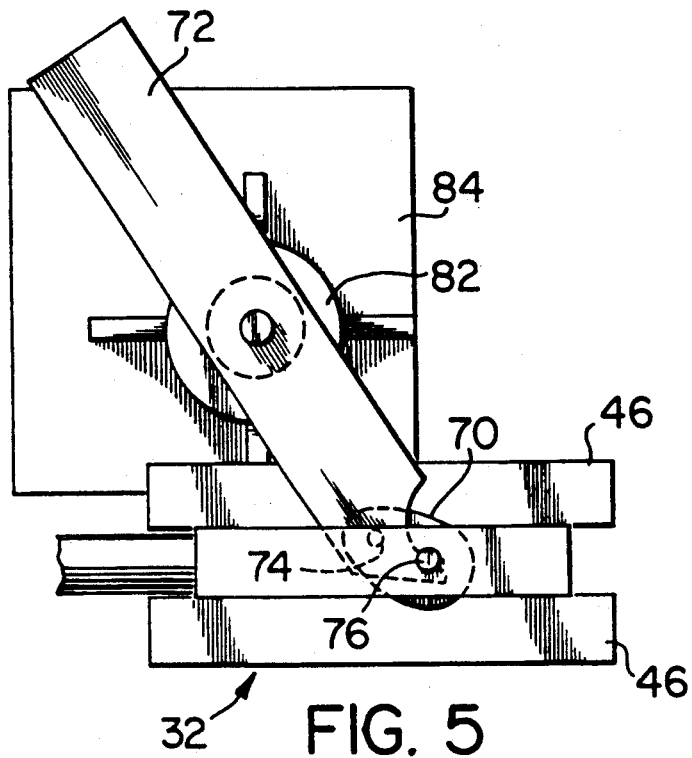
FIG. 5 is a view similar to FIG. 2 of the parts of the apparatus in the positions shown in FIG. 4.

To enable the vertical extruder 16 to move horizontally as the extruder head 14 moves in the direction of arrow 26, support structure 32 is pivotally mounted upon a support carrying linkage 68 as shown in FIG. 1 and particularly shown in FIG. 2. The linkage 68 is a simple linkage comprising a short link 70 and a long link 72 which are pivotally connected together each at one end, at a pivotal position 74 (FIG. 2). The link 70 is pivotally connected to the beam member 44 upon a pin 78, about a pivotal axis 76 which is spaced a short distance from the pivotal position 74, the link 70 extending beneath the beam member 44. For clarity, pivotal position 74 is shown by full outline in FIGS. 2 and 5 although the link 70 lies beneath the beam member 44. In turn the link 72 is pivotally mounted intermediate its ends about a pivotal axis 80 upon a fixed member in the form of a vertical support column 82 which is securely mounted upon a floor by a mounting pedestal 84. The axis 76 at the pivotal connection between the link 70 and the beam member 44 coincides with the axis of the screw of the vertical extruder 16.

As may be seen from the above description, in use the dual extruder head 14 is securely fastened directly to the extruders 12 and 16. The weight of the vertical extruder 16 is taken substantially completely by the pressurized air bags 58 which support beneath the beams 46. After start up and as extrudate is forced through the extruders 12 and 16 to form the layers of insulation 22 upon the conductor 18, the heat of the barrel and die heaters and of the extrudate causes differential expansion throughout the extruders and the head 14. The extruder 12 may expand away from its fixed upstream end thereby urging the head 14 in the axial direction of extruder 12 in the direction of arrow 26. To prevent the head 14 from being distorted or from cracking, it is necessary for the head to be maintained in alignment axially with the extruder 12 while carrying the extruder 16 horizontally with it and while ensuring that the stresses existing between the extruders and the head are minimized. Movement of the head 14 in the direction of arrow 26 under these conditions carries the vertical extruder 16 with it by transmitting a lateral load through the extruder 16 and into the support structure 32 to the linkage 68 through the pivotal pin 78. This load applied radially through the pin 78 causes a rotation of the linkage 68 around the pivotal axis 80 upon the fixed support column 82. The connections between the two extruders 12 and 16 and the head 14 maintain these three parts aligned without undue strain as the linkage 68 operates to permit the support structure 32 carrying the extruder 16 to remain in its original plane during expansion. While the linkage 68 rotates around the pivotal axis 80, relative pivoting movement occurs between the links 70 and 72 about the pivotal position 74 with the link 70 pivoting relative to the support structure 32 to enable the support structure to lie in its original plane as just mentioned. In essence therefore during the expansion of the elements of the apparatus in use, the linkage 68 moves to, new pivotal positions around the axis 80 while relative motion between the links 70 and 72 permit unstressed alignment to be maintained between the two extruders and the head. This is exemplified by the chain-dotted lines for the linkage 68 as shown in FIG. 2 in which, the relative pivotal positions of the links 70 and 72 have changed while the support structure 32 has moved towards the left in FIG. 2 while maintaining itself in its original planes.

It follows therefore that upon expansion of the extruder 12 and head 14 and the resultant movement of the head, not only does the vertical extruder move with the head, but as the support structure remains in its original planes then the vertical extruder 16 does not rotate but maintains its angular position relative to the head 14 whereby any temperature induced stresses are minimized.

In addition to this, the support structure 32 takes into account and compensates for any expansion of the vertical extruder 16 caused by temperature of the extrudate and also compensates for any vertical expansion of the head 14. As shown by FIG. 3, as the extruder 16 expands, its expansion occurs vertically upwards and this expansion is accommodated by pivoting of the parallelogram linkage by movement of the beams 46 and the link 50 about the pivotal positions 47 and 52 under the influence of the pressurized air bags 58. As the frame member 30 is one side of the parallelogram linkage and is vertical and parallel to the support member 42 forming an opposing side of the linkage, then any upward pivoting movement of the beams 46 and link 50 is transmitted into a pivoting movement of the frame member 30 about the pivotal positions 47 and 52 while retaining the frame member 30 in the same angular position, i.e. vertically. As the vertical extruder 16 is held by the arms 28 and 34 in vertical position and parallel to the frame member 30 then any upward movement of the vertical extruder causing the pivoting of the parallelogram linkage through the arm 28 retains the extruder in its vertical position. This is clear from an assumed and exaggerated position of expansion shown by the chain-dotted lines for the parallelogram in FIG. 3. This expansion of course is allowed to take place by the relative sliding movement of the lower end portion of the vertical extruder 16 through the ring 36 of the arm 34. Hence axial extension of the vertical extruder 16 is allowed to occur while again minimizing stresses caused by temperature variations.

It may be seen therefore and as discussed that the horizontal movement of the vertical extruder 16 is permitted by the support frame 32 being caused to rotate about the vertical axis 80 of the linkage 68, the two links of which also move relatively to each other for this purpose. In addition, the vertical expansion of the extruder 16 is permitted by the movement of the parallelogram linkage. However, movement of the parallelogram linkage to accommodate the vertical expansion will take place simultaneously with the horizontal movement of the extruder through the movement of the linkage 68. It is possible that the extruder 16 during movement of the parallelogram linkage may move slightly towards the support member 40 as shown by the chain-dotted lines in FIG. 3. This movement, of course, is in the opposite direction from that required of the vertical extruder to compensate for the expansion of the horizontal extruder 12. This situation presents no problem however as the extruder 16 remains in its desired position above the head 14 by a further movement of the linkage 68 anti-clockwise as shown in FIG. 2 to compensate for the slight deviation of the extruder 16 towards the support member 40. In essence therefore the parallelogram linkage and the linkage 68 operate in concert to provide the desired results.

Figure 4:
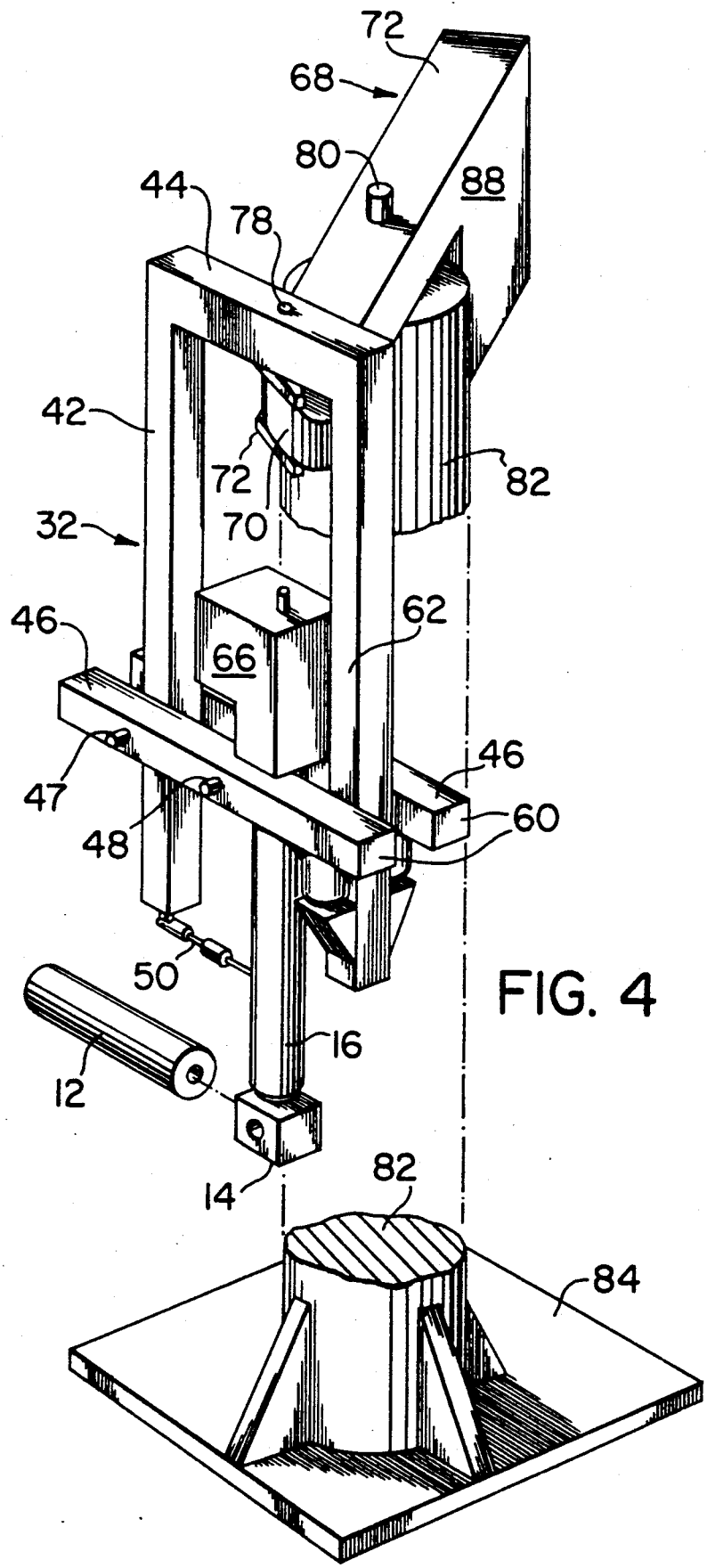
FIG. 4 is a view similar to FIG. 1 and showing respective parts of the apparatus after disconnection of a dual extrusion head and vertical extruder away from a horizontal extruder.
Figure 6:
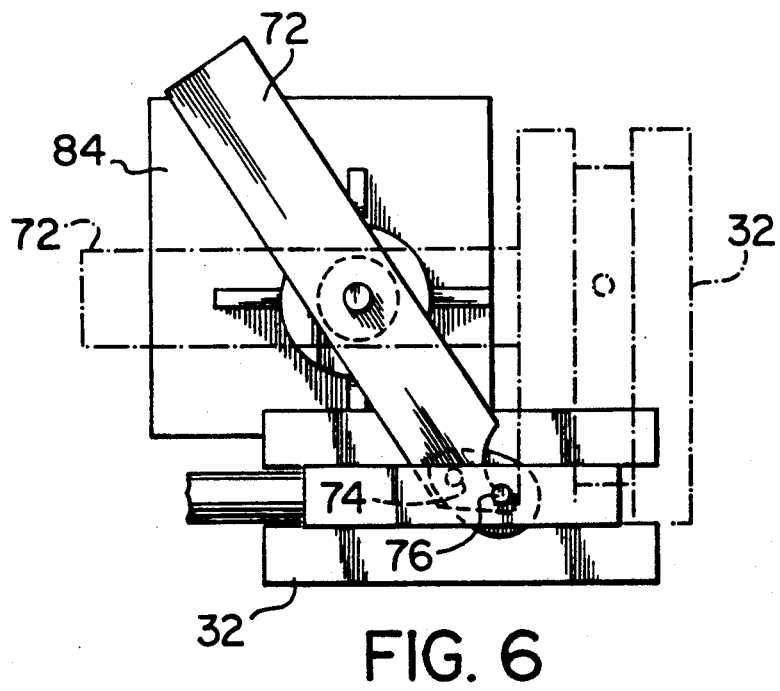
FIG. 6 is a view similar to FIG. 2 of reduced scale and showing a range of relative positions of parts of the apparatus when being for use.

The above embodiment illustrates that it is possible to provide two extruders secured directly to a dual extruder head while avoiding distortion and cracking of the various elements. In addition, with the above structure, design may be such as to ensure that the apparatus may be assembled and disassembled quickly for consecutive operations for applying insulation to different conductors, i.e. this means that the head 14 and vertical extruder 16 may be removed as a partial assembly away from the extruder 12 for maintenance and cleaning purposes. This objective is easily performed by providing a counterweight 88 at the end of the link 72 remote from the link 70 whereby, after disconnecting the extruder 12 from the head 14, the support structure 32, vertical extruder 16, head 14 and the linkage 68 may be caused to rotate around the pivotal axis 80 by simple manual pressure applied either to the support member 42 or to the carrier frame member 62. Thus the assembly of support structure, vertical extruder, head and linkage 68 is moved initially through the position shown by FIG. 4, possibly with the head 14 still in alignment with but spaced from the extruder 12 (see also FIG. 5), until the linkage 68 is moved into or towards the position shown in chain-dotted outline in FIG. 6. As may be seen, with the linkage in this position, it is a simple matter for an operator to clean or maintain the operational parts of the apparatus. Subsequently, it is then relatively simple to rotate the movable parts in the opposite direction around the axis 80 so as to reassemble them onto the extruder 12, pivotal movement of the support structure 32 also being required manually around the pivotal axis 76 to align the head 14 correctly with the extruder 12 before these two elements are secured together.

What is claimed is:

1. Apparatus for extruding two layers of material onto a core of indefinite length comprising:
   a dual extruder head having a passageway terminating in an extrusion orifice for the layers, a passline for the core extending through the passageway and out through the extrusion orifice;
   a horizontal extruder having an extrusion outlet connectable directly to a first inlet to the passageway of the extruder head;
   an upwardly extending extruder having an extrusion outlet connectable directly to a second inlet to the passageway of the extruder head;
   and a means to carry the weight of the upwardly extending extruder, said means having pivotal axes to allow for movement of the upwardly extending extruder so as to maintain desired alignment between the extruder head and each extruder and maintain the angular orientation of the upwardly extending extruder to minimize stresses caused by temperature variations while:
   a) allowing the head, during temperature variation induced expansion and contraction, to move the upwardly extending extruder horizontally to comply with the expansion and contraction; and
   b) allowing temperature variation induced axial extension and contraction of the upwardly extending extruder towards and away from the extruder head.

2. Apparatus according to claim 1 wherein the upwardly extending extruder is pivotally movable around a horizontally extending pivotal axis to allow for axial extension and contraction of the upwardly extending extruder.

3. Apparatus according to claim 2 wherein the weight carrying means comprises a parallelogram linkage and the upwardly extending extruder is mounted upon the parallelogram linkage, the pivotal axis lying at a point of pivotal connection of two sides of the linkage.

4. Apparatus according to claim 3 wherein the weight carrying means comprises a support structure for the upwardly extending extruder, the support structure comprising an upwardly extending support member which provides a first side of the parallelogram linkage, the upwardly extending extruder mounted upon a second side of the parallelogram linkage and which lies parallel to the first side and said second side has means for maintaining a desired axial orientation of the upwardly extending extruder while allowing for its axial expansion and contraction.

5. Apparatus according to claim 4 wherein the upwardly extending extruder is secured to the second side of the linkage at one axial location of the extruder and, at another axial location of the upwardly extending extruder the means for maintaining the desired axial orientation comprises a stabilizing member which extends around the upwardly extending extruder and engages that extruder at spaced positions around it while allowing for axial sliding movement of that extruder surface relative to the stabilizing member.

6. Apparatus according to claim 5 wherein the stabilizing member comprises a ring which closely surrounds the upwardly extending extruder while allowing for its axial sliding movement.

7. Apparatus according to claim 4 wherein an upwardly acting resilient means is operably connected to the upwardly extending extruder for supporting the combined weights of the extruder and pivotal sides of the parallelogram linkage.

8. Apparatus according to claim 7 wherein the support structure also comprises an upwardly extending carrier for the resilient means, the carrier horizontally spaced from the upwardly extending support member, and a third side of the parallelogram linkage which extends between and is pivotally connected to the first and second sides and is operably engaged by the resilient means.

9. Apparatus according to claim 8 wherein the upwardly extending extruder is disposed between the carrier and the support member and said third side has an extension extending beyond the second side of the parallelogram linkage, the resilient means comprising at least one gas pressurizable bag located in engagement beneath the extension and Carried by the carrier.

10. Apparatus according to claim 4 wherein the upwardly extending extruder is a vertical extruder and the support structure is pivotally mounted around a first vertical axis of a support carrying linkage which is pivotally mounted around a second vertical axis to a fixed member, horizontal movement of the vertical extruder to comply with expansion and contraction while maintaining the desired alignment between the extruder head and each extruder being effected by pivoting of the linkage around the second vertical axis and by relative pivoting movement of the elements of the linkage.

11. Apparatus according to claim 10 wherein the linkage comprises a first and second links pivotally connected together at a position of the links intermediate the first and second vertical axes.

12. Apparatus according to claim 10 wherein the first vertical axis coincides with the screw axis of the vertical extruder.

13. Apparatus according to claim 11 wherein the first vertical axis coincides with the screw axis of the vertical extruder.

* * * * *